UNITED STATES PATENT OFFICE.

WILLIAM A. COMSTOCK, OF PROVIDENCE, RHODE ISLAND.

IMPROVEMENT IN MANUFACTURE OF BUCKWHEAT-SIZE.

Specification forming part of Letters Patent No. 5,915, dated November 14, 1848.

*To all whom it may concern:*

Be it known that I, WILLIAM A. COMSTOCK, of Providence, in the county of Providence and State of Rhode Island, have invented a new and useful Process or Mode of Making from Buckwheat Sizing for Yarns; and I do hereby declare that the same is hereinafter fully set forth or described.

My improvement enables me to produce an excellent sizing at about one-third the cost of that in general use, and made from common wheat-flour.

Put into an open tub capable of containing about seventy gallons of water about one hundred pounds of buckwheat-meal. Mix the same with about forty gallons of water of a temperature of about 130° Fahrenheit's thermometer. Place the same in a room, the atmosphere of which is to be constantly maintained at a temperature of about 80° or 90° Fahrenheit. Allow the same to remain in said room (so heated) seven or eight days, or until it has thoroughly fermented. Next skim off the mingled bran and gluten which forms on the surface or upper part of the mixture, and, by means of a siphon or any other suitable substitute, remove the remaining watery and superfluous liquid from the pasty mass. Next mix water in quantity sufficient to enable the composition to be passed through a fine brass-wire sieve and into another tub, in which suffer it to remain two days, or until the meal has subsided to the bottom thereof. Next skim off the impurities or extraneous matters and remove the superfluous water in a manner similar to that before mentioned. Next dissolve about eight ounces of supercarbonate of soda in one gallon of water, and when so dissolved add the solution to the pasty mass and thoroughly mix it therewith. Put the whole so prepared into a suitable boiling-vessel, and with water sufficient to make about one hundred and forty gallons of the mixture after the next or boiling operation is completed. For a boiling apparatus I prefer one having a steam-pipe, and in this and in other respects essentially like that in common use for boiling starch. After thoroughly incorporating the mixture and the water bring the whole up to a boiling-point as soon as possible, being careful in the meantime to stir it energetically in order to prevent the meal from falling to the bottom. Next slowly boil the mixture for about three hours, and afterward draw it off into tubs holding about seventy gallons each, in which suffer it to remain until it is cooled down to the common or mean atmospheric temperature, when it will be fit for use.

The object of the employment of the soda is to neutralize the acid of fermentation and restore the mass to its proper state during and in connection with the next portion of the process—viz., that of boiling and energetically stirring the mixture. The whole process, in all its details, is necessary to the manufacture of a sizing from buckwheat which will possess both preservative and workable properties.

What I claim as my invention is—

The making of sizing for yarns from buckwheat-meal substantially in the manner or by the process as hereinbefore specified, the same enabling me, at about one-third the usual expense of preparing wheat-flour size, to produce a much better and more substantial size—one more especially adapted for fine yarns or difficult weaving—than any heretofore in use.

In testimony whereof I have hereto set my signature this 17th day of November, A. D. 1847.

WILLIAM A. COMSTOCK.

Witnesses:
WM. KNOWLES,
SAMUEL ASHBEY.